Feb. 14, 1961   G. WEISHEIT   2,971,379
RESISTANCE THERMOMETER
Filed June 27, 1957
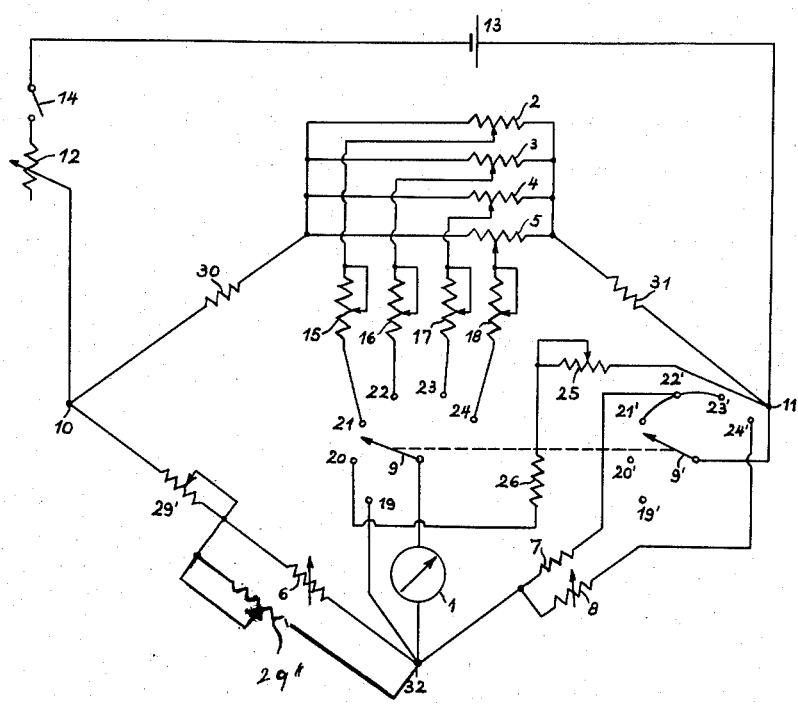
INVENTOR
GEORG WEISHEIT
By  Frank F. Ross
AGENT

2,971,379
RESISTANCE THERMOMETER

Georg Weisheit, Trappenbergstrasse 37, Essen-Stadtwald, Germany

Filed June 27, 1957, Ser. No. 668,413

Claims priority, application Germany Aug. 24, 1956

7 Claims. (Cl. 73—362)

My present invention relates to a resistance thermometer of the type wherein a thermosensitive electric circuit element, such as a directly heated thermistor, is connected in an arm of a Wheatstone bridge whereby variations in ambient temperature, resulting in a change of the state of unbalance of the bridge, may be read on a suitably calibrated indicating instrument (e.g. an ammeter) inserted in one of the bridge diagonals.

Although thermometers of this description are highly sensitive and dependable in operation, their use has hitherto been limited largely to laboratory work since any damage to the associated temperature gauge, which incorporates the thermosensitive element, will require not only a replacement of such gauge but also an involved rebalancing of the bridge far beyond the capacities of the average physician or other user who is not an expert in the electrical art. This inconvenience is due to the difficulty of serially producing thermosensitive elements having not only the same absolute resistance at a given temperature but also resistance/temperature characteristics of sufficiently similar slope to make them directly interchangeable for use over an extended temperature range. It has, therefore, generally been necessary in the past to return the entire equipment to the factory for readjustment whenever the temperature gauge alone had become faulty.

An important object of the present invention is to provide an improved thermometer of the character set forth in which a replacement of the temperature gauge can be carried out by a layman on the basis of simple instructions.

Another object of my invention is to provide a thermometer of this description having means for readily compensating changes in input voltage (due, for example, to the aging of a battery serving as the power supply) so as to insure proper operation of the device over a prolonged period or with different sources of electric current.

A feature of my invention resides in the provision of a thermometer of the aforesaid type whose resistance bridge, having a thermosensitive resistance element connected in one arm thereof, co-operates with a current-measuring instrument connected in the output diagonal of the bridge, the instrument being preferably provided with a plurality of scales corresponding to several staggered temperature ranges; there is further provided, for each temperature range, a balancing potentiometer whose slider represents an adjustable junction of two bridge arms, this slider being connected to a variable resistor inserted in the aforementioned bridge diagonal in series with the measuring instrument.

Another feature of my invention resides in the provision of variable resistance means, in the form of one or more adjustable series and/or shunt resistors, inserted in the bridge arm containing the thermosensitive resistance element so as to be operable to rebalance the bridge after a replacement of this resistance element by another, not wholly identical element.

A further feature of my invention resides in the provision of a variable resistance connected across the input diagonal of the bridge, in series with an electric current source, for the purpose of compensating variations in the output voltage of such source. Advantageously, the bridge circuit also includes switch means for connecting the current-measuring instrument in one of the bridge arms, in series with a preset testing resistance, to enable a determination of the correct adjustment to be given to the variable compensating resistance. The same switch means may be used, according to still another feature of my invention, for selecting the temperature ranges of the instrument and/or for inserting a second thermosensitive resistance element in a second bridge arm to enable measurements of temperature differences rather than absolute temperature values.

The invention will be described in greater detail with reference to the accompanying drawing whose sole figure shows a circuit diagram of a preferred embodiment.

A measuring instrument 1, such as a microammeter, has one of its terminals connected to the arm 9 of a selector switch which is ganged with a second switch arm 9'. Associated with switch arm 9 are six bank contacts 19, 20, 21, 22, 23 and 24, a series of corresponding bank contacts associated with switch arm 9' being designated 19', 20', 21', 22', 23' and 24'. Contacts 21, 22, 23 and 24 are connected, by way of individual adjustable series resistors 15, 16, 17 and 18, to the sliders of respective potentiometers 2, 3, 4 and 5 which are connected in parallel between two fixed resistances 30 and 31 constituting, together with the adjacent potentiometer portions, two arms of a Wheatstone bridge circuit. These arms terminate at opposite junctions 10 and 11 which define the input diagonal of the bridge, a voltage source 13 (shown as a battery) being connected across this diagonal in series with a circuit breaker 14 and a variable compensating resistor 12; source 13 and resistor 12 constitute a controllable energizing circuit for the bridge.

The fourth junction 32 of the bridge, opposite the one constituted by the sliders of potentiometers 2–5, is connected to the other terminal of meter 1. The bridge arm extending between junctions 10 and 32 comprises a thermistor 6, a variable series resistor 29' and a variable shunt resistor 29''. The fourth bridge arm, extending between junctions 11 and 32, includes switch arm 9' connected to junction 11, a fixed resistor 7 connected between junction 32 and bank contacts 21', 22', 23', and a second thermistor 8, as nearly identical with element 6 as is practically realizable, connected between junction 32 and bank contact 24'. A shunt path for this fourth bridge arm extends from junction 11 via a variable testing resistor 25 and a fixed testing resistor 26 to bank contact 20; bank contact 19 is connected directly to junction 32 while bank contacts 19' and 20' are left unconnected.

In a typical practical embodiment the meter 1 may have three scales for the temperature ranges of 36° to 38° C., 38° to 40° C. and 40° to 42° C., respectively, corresponding to the positions 21/21', 22/22' and 23/23' of selector switch 9—9'; the meter may be designed for a current of 10 microamperes. The balancing potentiometers 2, 3, 4 and 5 may each have a maximum resistance of 50 kilo-ohms, with the variable series resistors 15, 16, 17 and 18 given a maximum resistance of 20 kilo-ohms. At a predetermined operating temperature, e.g. 42° C., the thermistors 6 and 8 may have a resistance of about 200 to 250 kilo-ohms, with a rated capacity of 50 kilowatts or less. The value of the fixed resistance 7 may be of the order of 100 kilo-ohms. The remaining resistances are likewise preferably of the high-ohmic type to reduce the current consumption. Source 13 may have an output voltage of 22.5 volts.

With circuit breaker 14 closed and switch 9—9' in its position 19/19', the system is inoperative since the bridge is open at switch arm 9' and the meter 1 is short-circuited. In switch position 20/20' the aforementioned shunt path is closed through meter 1 so that the latter is connected across source 13 in series with resistance elements 12, 29', 6 and 29", 26 and 25. With thermistor 6 maintained at a predetermined testing temperature (e.g. 42° C.), the meter 1 should now indicate, by the deflection of its pointer, a predetermined value for the voltage of source 13. If this deflection is not observed, as where the input voltage is reduced because of a partial depletion or aging of the battery, a compensatory adjustment may now be made with the aid of variable resistor 12; this adjustment can be readily performed by any unskilled user. The initial setting of resistor 12 should be such that the voltage impressed upon input terminals 10, 11 by source 13 equals that (e.g. 10 volts) used in the original calibration of the apparatus.

In switch position 21/21' the meter 1 should give a null reading when the thermistor 6 is heated to a reference temperature, e.g. 38°C. in the first operating range, the meter being of course suitably calibrated to indicate this particular temperature. If this reading is not observed, the position of the displaceable tap of potentiometer 2 is changed until the proper indication has been obtained and the bridge is in balance. Next, the thermistor 6 may be exposed to a different ambient temperature, e.g. of 36° C., and the series resistor 15 adjusted until a corresponding reading appears on the meter. In like manner the resistance combinations 3—16 and 4—17 may be reset in switch positions 22/22' and 23/23', respectively to adjust the readings in the other two temperature ranges. For differential temperature measurements, the selector switch is set to position 24/24' and an analogous manipulation of potentiometer 5 and resistor 18, e.g. at temperature differences of 0° and 2°C. between thermistor 6 and 8, will result in corresponding readings on a further scale provided for this purpose on meter 1. It will be apparent that these balancing operations eliminate any errors due to spurious resistances, e.g. at the soldered connections, and/or to deviations of the actual resistances of the various circuit elements from their rated values.

The potentiometers 2–5 and the associated series resistor 15–18 may be adjusted once and for all at the factory and will usually not require further manipulation by the user, even in the event of destruction of the temperature gauge containing the thermistor 6. In such event, owing to the provision of resistors 29' and 29", it will not be necessary to replace this thermistor by an identical thermosensitive element. Thus, if the substitute thermistor has a resistance/temperature characteristic which is similar in slope to that of thermistor 6 but differs therefrom in its absolute values, proper compensation may be made merely by adjusting the series resistor 29' until, at a predetermined reference temperature (e.g. 42°C.), meter 1 gives the correct reading. If the substitute thermistor differs from element 6 in the slope of its characteristic but has the same resistance at the reference temperature, compensation for the slope deviations may be made without changes in the bridge balance at the reference temperature by the simultaneous adjustment of resistors 29' and 29" until the reading is correct at two reference points, e.g. at opposite ends of the temperature scale. Even if the two thermistors differ both in slope and in absolute values, proper compensation may be effected by progressive alternate adjustment of the two resistors 29', 29" to reduce the error at the two reference points.

From the foregoing description it will be apparent that, by the combination of the various features herein disclosed, I have provided a simple, dependable and virtually foolproof thermometric device for medicinal as well as industrial uses. The invention is, of course, not limited to the specific embodiment described and illustrated but may be realized in various modifications and adaptations without departing from the spirit and scope of the appended claims.

I claim:
1. A thermometric device comprising a bridge circuit with four resistance arms defining an input diagonal and an output diagonal, one of said arms including a thermosensitive resistance element, current-measuring means inserted in said output diagonal, a controllable energizing circuit connected across said input diagonal, said energizing circuit including a source of voltage and an adjustable compensating resistor, and switch means for interrupting one of said arms and said output diagonal while connecting said current-measuring means in series with an adjacent one of said arms across said energizing circuit.

2. A thermometric device comprising a bridge circuit with four resistance arms defining an input diagonal and an output diagonal, one of said arms including adjustable resistance means and a thermosensitive resistance element, current-measuring means inserted in said output diagonal, a source of voltage connected across said input diagonal, an adjustable compensating resistor connected across said input diagonal in series with said source, and switch means for interrupting one of said arms and said output diagonal while connecting said current-measuring means in series with an adjacent one of said arms across said source and said compensating resistor.

3. A thermometric device comprising a bridge circuit with four resistance arms, one of said arms including adjustable resistance means and a thermosensitive resistance element, a potentiometer having portions included in two other of said arms and a displaceable tap between said portions, said tap constituting one end of an output diagonal of said bridge circuit, current-measuring means inserted in said output diagonal, a controllable energizing circuit connected across the other diagonal of said bridge circuit, said energizing circuit including a source of voltage and an adjustable compensating resistor, and switch means for interrupting one of said arms and said output diagonal while connecting said current-measuring means in series with an adjacent one of said arms across said energizing circuit.

4. A thermometric device comprising a bridge circuit with four resistance arms, one of said arms including adjustable resistance means and a thermosensitive resistance element, a potentiometer having portions included in two other of said arms and a displaceable tap between said portions, said tap constituting one end of an output diagonal of said bridge circuit, current-measuring means inserted in said output diagonal, a source of voltage connected across the other diagonal of said bridge circuit, an adjustable compensating resistor connected across said other diagonal in series with said source, and switch means for interrupting one of said arms and said output diagonal while connecting said current-measuring means in series with an adjacent one of said arms across said source and said compensating resistor.

5. A thermometric device comprising a bridge circuit with four resistance arms, one of said arms including adjustable resistance means and a thermosensitive resistance element, a potentiometer having portions included in two other of said arms and a displaceable tap between said portions, said tap constituting one end of an output diagonal of said bridge circuit, current-measuring means and a variable resistor serially inserted in said output diagonal, a source of voltage connected across the other diagonal of said bridge circuit, an adjustable compensating resistor connected across said other diagonal in series with said source, and switch means for interrupting the fourth of said arms and said output diagonal while connecting said current-measuring means in series with said one arm across said source and said compensating resistor.

6. A thermometric device comprising a bridge circuit with four resistance arms, one of said arms including adjustable resistance means and a first thermosensitive resistance element, a plurality of potentiometers connected in parallel with one another, each of said potentiometers having a displaceable tap and portions, separated by said tap, included in two other of said arms, a plurality of variable resistors each connected to a respective one of said taps, current-measuring means connected to the junction of said one arm with the fourth of said arms, switch means selectively movable to a plurality of operative positions for completing an output diagonal for said bridge circuit by connecting said current-measuring means to one of said taps via the associated variable resistor, a fixed resistor connectable in said fourth arm by said switch means in certain of said operative positions, a second thermosensitive resistance element, substantially identical in performance with said first element, connectable in said fourth arm in lieu of said fixed resistor by said switch means in another of said operative positions, a resistive test circuit connectable in series with said current-measuring means in said fourth arm, in lieu of said fixed resistor and said second element, by said switch means in a further position thereof in which said output diagonal is open, a source of voltage connected across the other diagonal of said bridge circuit, and an adjustable compensating resistor connected across said other diagonal in series with said source.

7. A device according to claim 6, wherein said resistive test circuit includes a fixed resistance and a variable resistance in series.

References Cited in the file of this patent

UNITED STATES PATENTS

| | | |
|---|---|---|
| 1,206,968 | Wilsey | Dec. 5, 1916 |
| 1,460,530 | Brown et al. | July 3, 1923 |
| 1,665,397 | Wunsch | Apr. 10, 1928 |
| 2,135,513 | Holven | Nov. 8, 1938 |
| 2,416,276 | Ruge | Feb. 18, 1947 |
| 2,591,759 | Zaikowsky | Apr. 8, 1952 |
| 2,649,715 | Gobel | Aug. 25, 1953 |
| 2,711,650 | Weisheit | June 28, 1955 |